United States Patent [19]
Yahiro

[11] Patent Number: 6,077,908
[45] Date of Patent: Jun. 20, 2000

[54] POLYOXYMETHYLENE RESIN COMPOSITION

[75] Inventor: Shyuzi Yahiro, Kurashiki, Japan

[73] Assignee: Asahi Kasei Kogyo Kabushiki Kaisha, Osaka, Japan

[21] Appl. No.: 09/043,083

[22] PCT Filed: Sep. 5, 1996

[86] PCT No.: PCT/JP96/02523

§ 371 Date: Mar. 6, 1998

§ 102(e) Date: Mar. 6, 1998

[87] PCT Pub. No.: WO97/09383

PCT Pub. Date: Mar. 13, 1997

[30] Foreign Application Priority Data

Sep. 7, 1995 [JP] Japan .................................... 7-229773

[51] Int. Cl.⁷ .................................................. C08L 33/24
[52] U.S. Cl. .......................... 525/218; 525/282; 528/310; 528/322
[58] Field of Search ..................... 525/218, 282; 528/310, 322

[56] References Cited

U.S. PATENT DOCUMENTS 3,219,727  11/1965  Kray et al. .
5,015,707  5/1991  Yamamoto et al. .

FOREIGN PATENT DOCUMENTS

| | | |
|---|---|---|
| 43-14329 | 6/1968 | Japan . |
| 63-108051 | 5/1988 | Japan . |
| 3-28260 | 2/1991 | Japan . |
| 3-200857 | 9/1991 | Japan . |
| 4-277560 | 10/1992 | Japan . |
| 6-184403 | 7/1994 | Japan . |

*Primary Examiner*—Duc Truong
*Attorney, Agent, or Firm*—Pennie & Edmonds LLP

[57] ABSTRACT

A polyoxymethylene resin composition comprising (A) 100 parts by weight of a polyoxymethylene resin and (B) 0.01 to 10 parts by weight of a vinyl compound having a primary acid amide group and an acid imide group is provided. The composition is excellent in heat stability in molding and weatherability and suited for use as a molding material for electric and electronic parts and automotive parts.

14 Claims, No Drawings

POLYOXYMETHYLENE RESIN COMPOSITION

TECHNICAL FIELD

The present invention relates to a polyoxymethylene resin composition having excellent heat stability on molding as well as various other properties. More particularly, it relates to a polyoxymethylene resin composition having improved heat stability in the presence of oxygen and excellent weatherability as compared with conventional polyoxymethylene resin compositions.

BACKGROUND ART

Polyoxymethylene resins have been widely used in automotive parts and electric and electronic parts because of their well-balanced mechanical properties and excellent fatigue characteristics. While the quality of polyoxymethylene resins has improved with increasing diversity of uses, conventional polyoxymethylene resins have unsatisfactory heat stability, giving rise to deterioration in appearance of moldings due to adhered matters to a mold (mold deposit). The poor heat stability of polyoxymethylene resins is ascribed to oxidative decomposition of the resin with a trace amount of oxygen to increase the amount of formaldehyde of decomposition at the time of molding. It is considered that the generated formaldehyde is converted to formic acid, which accelerates decomposition of the main chain of the polyoxymethylene resin.

As an approach to solving this problem, JP-B-43-14329 (the term "JP-B" as used herein means an "examined published Japanese patent application") and U.S. Pat. No. 3,219,727 propose to use an acrylamide polymer as a scavenger of formaldehyde generated by decomposition of a polyoxymethylene resin. However, the polyoxymethylene resin compositions disclosed in the two publications above are still unsatisfactory in heat stability and weatherability. Besides, neither of the publications has a mention of the importance of an acid imide group as used in the present invention. JP-B-6-10259 discloses a β-alanine copolymer as a formaldehyde scavenger but has no mention of improvement on heat stability and weatherability of a polyoxymethylene resin by the existence of an acid imide group that is a characteristic point of the present invention. Further, JP-A-3-28260 (corresponding to U.S. Pat. No. 5,011,890 and EP-A-388809) discloses a composition comprising polyoxymethylene and polyacrylamide fine particles. Although the composition disclosed exhibits somewhat improved heat stability under nitrogen, the heat stability is still unsatisfactory in the presence of oxygen, i.e., under actual molding conditions, as will be verified in Comparative Examples 1 and 2 hereinafter given. This publication relates to a vinyl polymer having an amide group or a hydroxyl group, giving no suggestion with reference to the importance of an acid imide group characteristic of the present invention.

An object of the present invention is to provide a polyoxymethylene resin composition excellent in not only heat stability in the presence of oxygen but weatherability.

DISCLOSURE OF THE INVENTION

The inventors of the present invention have conducted extensive study to accomplish the above object. As a result, they have found that a polyoxymethylene resin composition excellent in heat stability in the presence of oxygen and weatherability can be obtained by adding to a polyoxymethylene resin a vinyl polymer having a specific functional group. The invention has been reached based on this finding.

The invention provides a polyoxymethylene resin composition comprising:
(A) 100 parts by weight of a polyoxymethylene resin and
(B) 0.01 to 10 parts by weight of a vinyl polymer having a primary acid amide group and an acid imide group.

BEST MODE FOR CARRYING OUT THE INVENTION

The polyoxymethylene resin as component (A) includes homopolymers obtained by polymerizing formaldehyde or a cyclic oligomer thereof, such as a trimer (i.e., trioxan) or a tetramer (i.e., tetroxan), and blocking the terminals with an ether group or an ester group; copolymers of formaldehyde or its trimer or tetramer (i.e., trioxan or tetroxan) and such comonomers as ethylene oxide, propylene oxide, 1,3-dioxolane, or 1,4-butanediol formal; those having a branched molecular chain; and oxymethylene block copolymers. An oxymethylene homopolymer having its both terminals acetylated is preferred.

The polyoxymethylene for use in the invention usually has a melt index (MI; measured according to ASTM-D1238-57T) of 0.1 to 150 g/10 min, preferably 1 to 100 g/10 min. The oxymethylene copolymers usually comprise 0.1 to 20 mol, preferably 0.3 to 10 mol, of the comonomer unit per 100 mol of the oxymethylene unit.

Component (B) used in the invention is a vinyl polymer having a primary acid amide group and an acid imide group. The primary acid amide group in the vinyl polymer functions to scavenge the formaldehyde generated by decomposition of polyoxymethylene. Part of the formaldehyde remaining unscavenged is considered to be oxidized to formic acid. While the mechanism of action of the acid imide group in the vinyl polymer has not yet been elucidated, the acid imide group is considered to adsorb the formic acid efficiently. It is believed that the acid decomposition of a polyoxymethylene resin by formic acid can be suppressed by the action of the acid imide group thereby to improve heat stability of the polyoxymethylene resin composition in the presence of oxygen.

Formaldehyde is also generated when a polyoxymethylene resin composition is exposed to ultraviolet light or sunlight and the main chain of polyoxymethylene is decomposed by light energy. The thus generated formaldehyde is considered to be further oxidized to formic acid, which accelerates decomposition of the polyoxymethylene. It is considered that the formic acid generated is also adsorbed by the vinyl polymer having an acid imide group. As a result, the polyoxymethylene resin composition of the invention exhibits greatly improved weatherability over the conventional composition containing a vinyl polymer having only a primary acid amide.

The vinyl polymer having a primary acid amide group and an acid imide group is added in an amount of 0.01 to 10 parts by weight, preferably 0.05 to 3 parts by weight, per 100 parts by weight of polyoxymethylene. If the amount of the vinyl polymer is less than 0.01 part by weight, the polyoxymethylene resin composition has reduced heat stability. If it exceeds 10 parts by weight, the polyoxymethylene resin composition only provides moldings having poor appearance with no gloss.

The acid imide group content in the vinyl polymer is preferably 0.0001 to 0.25 mol, still preferably 0.001 to 0.1 mol, particularly preferably 0.05 to 0.1 mol, per mol of the primary acid amide group of the vinyl polymer. The above range being satisfied, the improvements in heat stability and weatherability of the polyoxymethylene resin composition is ensured, and coloration on moldings is suppressed.

The production processes of the vinyl polymer used in the invention is described below.

A first process for preparing the vinyl polymer is copolymerization of a vinyl monomer having a primary acid amide group and a vinyl monomer having an acid imide group. Examples of the vinyl monomer having a primary acid amide group include acrylamide, methacrylamide, phenylacrylamide, and chloroacrylamide. Examples of the vinyl monomer having an acid imide group include N-acetylacrylamide, N-acryloylacrylamide, and maleinimide. The vinyl monomer having an acid imide group is prepared by reacting a vinyl monomer having a primary acid amide group with an acid anhydride, such as acetic anhydride, or an acid chloride, such as acetyl chloride or acrylic acid chloride. In this production process, vinyl polymers containing both a primary acid amide group and an acid imide group and having various compositions can be obtained by radical copolymerization, cation copolymerization or anion copolymerization while adjusting the amounts of the vinyl monomers to be charged. Of these polymerization processes, radical copolymerization using an emulsifier or a dispersant is preferred since the resulting vinyl polymer is obtained as fine particles.

A second process for preparing the vinyl polymer of the invention is conversion of part of a primary acid amide group of a vinyl polymer to an acid imide group. This process can be achieved by (a) a method comprising reacting the primary acid amide group of a vinyl polymer with an acid chloride (e.g., acetyl chloride) or an acid anhydride (e.g., acetic anhydride) to convert the same to an acid imide group or (b) a deammoniation method comprising heating a vinyl polymer having a primary acid amide group at a temperature of 120° C. or higher to release 1 mol of ammonia from 2 mol of the primary acid amide group to cause formation of 1 mol of an acid imide group (see *Gosei Kobunshi VI* (Synthetic Polymers VI), Chapter 2, Asakura Shoten (1975)). Of the processes for preparing the vinyl polymer of the invention, the deammoniation process is preferred because of ease of operation and also because the acid imide content of the resulting vinyl polymer can be controlled by quantitative determination of generated ammonia. Preferred starting vinyl polymers having a primary acid amide group to be used in the deammoniation process are polyacrylamide, polymethacrylamide and poly-β-alanine.

The content of the primary acid amide group and acid imide group in the vinyl polymer can be determined quantitatively by nuclear magnetic resonance analysis, elementary analysis, infrared spectrophotometry, the above-mentioned ammonia determination, and the like.

The vinyl polymer for use in the invention may further comprise other vinyl comonomers in addition to the above-described vinyl monomers. Examples of other vinyl comonomers include styrene or derivatives thereof, e.g., divinylbenzene and methylstyrene; acrylonitrile; methacrylonitrile; alkyl acrylates, e.g., methyl acrylate; alkyl methacrylates, e.g., methyl methacrylate, hydroxypropyl methacrylate, ethylene glycol dimethacrylate, and glycidyl methacrylate; vinyl ethers, e.g., vinyl methyl ether; vinyl ketones, e.g., vinyl methyl ketone; vinyl monomers having a secondary amide group, e.g., N,N-methylenebisacrylamide, N-methylolacrylamide, and vinylacetamide; and vinyl monomers having a tertiary amide group, e.g., N-vinylpyrrolidone. Polyfunctional vinyl monomers, such as N,N-methylenebisacrylamide, divinylbenzene, and glycidyl methacrylate, are preferred comonomers.

While not limiting, the vinyl polymer preferably has a number average particle size of 0.5 to 5 μm. Too small particles are not only difficult to handle but liable to agglomerate during handling, resulting in insufficient dispersion in the polyoxymethylene resin composition. As a result, the heat stability and weatherability of the polyoxymethylene resin composition are impaired.

In order for the vinyl polymer to act effectively, the amount of the acid imide group and the amount of the primary acid amide group present on the surface of the vinyl polymer particles after mixing with polyoxymethylene are of importance. Therefore, if the vinyl polymer has too large a number average particle size, the amount of the acid imide group that can contact with polyoxymethylene will be insufficient for ensuring satisfactory heat stability and weatherability of the polyoxymethylene resin composition.

The vinyl polymer for use in the invention is ground to fine powder by means of a jet mill, a victory mill, an Ultraprex mill, an atomizer, etc. In particular, a jet mill is easy to operate. Fine powder of the vinyl polymer may also be obtained by a reprecipitation method in which the vinyl polymer dissolved in a good solvent is poured into a poor solvent or a method of producing the vinyl polymer in the form of fine particles by selecting an appropriate solvent and a dispersant. The number average particle size of the vinyl polymer can be measured with a Coulter counter.

While the molecular weight of the vinyl polymer is not particularly limited, high-molecular weight polymers having a number average molecular weight of 1000 or more are preferred in order to avoid deterioration of the surface condition of moldings due to mold deposit.

The polyoxymethylene resin composition of the present invention can further contain additives that have been added to conventional polyoxymethylene, such as an antioxidant, a formic acid scavenger, a weathering (light) stabilizer, a lubricant, a parting agent, a reinforcement, a pigment, a nucleating agent, and combinations thereof. These additives are added usually in an amount of from 0.0005 to 10 part by weight, preferably of from 0.001 to 5 part by weight, per 100 parts by weight of the polyoxymethylene resin composition.

Inter alia, a combined use of the following antioxidants and/or formic acid scavengers is effective in improving the heat stability of the polyoxymethylene resin composition, and a combined use of the following weathering (light) stabilizers is effective in improving the weatherability of the polyoxymethylene resin composition.

The antioxidants preferably include hindered phenol type antioxidants, such as n-octadecyl 3-(3',5'-di-t-butyl-4'-hydroxyphenyl)propionate, n-octadenyl 3-(3'-methyl-5'-t-butyl-4'-hydroxyphenyl)propionate, n-tetradecyl 3-(3',5'-di-t-butyl-4'-hydroxyphenyl)propionate, 1,6-hexanediol bis[3-(3,5-di-t-butyl-4-hydroxyphenyl)propionate], 1,4-butanediol bis[3-(3,5-di-t-butyl-4-hydroxyphenyl) propionate], triethylene glycol bis[3-(3-t-butyl-5-methyl-4-hydroxyphenyl)propionate], tetrakis[methylene-3-(3',5'-di-t-butyl-4'-hydroxyphenyl)propionate]methane, 3,9-bis{2-[3-(3-t-butyl-4-hydroxy-5-methylphenyl)propionyloxy]-1,1-dimethylethyl}-2,4,8,10-tetraoxaspiro(5,5)undecane, N,N'-bis[3-(3',5'-di-t-butyl-4-hydroxyphenyl)propionyl] hexamethylenediamine, N,N'-tetramethylenebis[3-(3'-methyl-5'-t-butyl-4-hydroxyphenyl)propionyl]diamine, N,N'-bis[3-(3,5-di-t-butyl-4-hydroxyphenyl) propionyl] hydrazine, N-salicyloyl-N'-salicylidenehydrazine, 3-(N-salicyloyl)amino-1,2,4-triazole, and N,N'-bis{2-[3-(3,5-di-butyl-4-hydroxyphenyl)propionyloxy]ethyl}oxyamide. Preferred of these hindered phenol type antioxidants are triethylene glycol bis[3-(3-t-butyl-5-methyl-4-hydroxyphenyl)propionate] and tetrakis[methylene-3-(3',5'-di-t-butyl-4'-hydroxyphenyl)propionate]methane.

The formic acid scavengers include (a) an amino-substituted triazine, (b) a condensation product of an amino-substituted triazine and formaldehyde, and (c) a hydroxide, an inorganic acid salt, a carboxylic acid salt or an alkoxide of an alkali metal or an alkaline earth metal.

Examples of the amino-substituted triazine (a) are guanamine (i.e., 2,4-diamino-sym-triazine), melamine (i.e., 2,4,6-triamino-sym-triazine), N-butylmelamine, N-phenylmelamine, N,N-diphenylmelamine, N,N-diallylmelamine, N,N',N"-triphenylmelamine, N-methylolmelamine, N,N'-dimethylolmelamine, N,N',N"-trimethylolmelamine, benzoguanamine (i.e., 2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dihydroxy-6-amino-sym-triazine (ammelide), 2-hydroxy-4,6-diamino-sym-triazine (ammeline), and N,N',N"-tetracyanoethylbenzoguanamine. Preferred of these amino-substituted triazine compounds are melamine and methylolmelamine.

The condensation product (b) of an amino-substituted triazine and formaldehyde includes a melamine-formaldehyde polycondensate.

The hydroxide, inorganic acid salt, carboxylic acid salt or alkoxide of an alkali metal or an alkaline earth metal (c) includes a hydroxide, a carbonate, a phosphate, a silicate, a borate or a carboxylate of sodium, potassium, magnesium, calcium or barium. The carboxylic acid of the carboxylate includes saturated or unsaturated aliphatic carboxylic acids having 10 to 36 carbon atoms. These carboxylic acids may be substituted with a hydroxyl group. Examples of the saturated aliphatic carboxylic acids are capric acid, lauric acid, myristic acid, palmitic acid, stearic acid, arachic acid, behenic acid, lignoceric acid, cerotic acid, montanic acid, melissic acid, and ceroplastic acid. Examples of unsaturated aliphatic carboxylic acids are undecylenic acid, oleic acid, elaidic acid, cetoleic acid, erucic acid, brassidic acid, sorbic acid, linoleic acid, linolenic acid, arachidonic acid, propiolic acid, and stearolic acid. Examples of the alkoxide includes a methoxide and an ethoxide of the above-described metals.

Of these formic acid scavengers, preferred are melamine, a melamine-formaldehyde polycondensate, particularly a hot water-soluble melamine-formaldehyde polycondensate, calcium laurate, calcium stearate, and calcium behenate.

The weathering (light) stabilizers preferably include (a) benzotriazole derivatives, (b) oxalic anilide compounds, and (c) hindered amine compounds.

Examples of the benzotriazole derivatives (a) are 2-(2'-hydroxy-5'-methylphenyl)benzotriazole, 2-[2'-hydroxy-3',5'-di-t-butylphenyl)benzotriazole, 2-[2'-hydroxy-3',5'-diisoamylphenyl)benzotriazole, 2-[2'-hydroxy-3',5'-bis(α,α-dimethylbenzyl)phenyl]-2H-benzotriazole, and 2-(2'-hydroxy-4'-octoxyphenyl)benzotriazole. Preferred of them are 2-[2'-hydroxy-3',5'-bis(α,α-dimethylbenzyl)phenyl]-2H-benzotriazole and 2-(2'-hydroxy-3',5'-di-t-butylphenyl)benzotriazole.

Examples of the oxalic anilide compounds (b) are 2-ethoxy-2'-ethyloxalic dianilide, 2-ethoxy-5-t-butyl-2'-ethyloxalic dianilide, and 2-ethoxy-3'-dodecyloxalic dianilide. These compounds may be used either individually or as a combination of two or more thereof.

Examples of the hindered amine compounds (c) are 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-phenylacetoxy-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phanylhexylcarbamoyloxy)-2,2,6,6-tetramethylpiperidine, bis(2,2,6,6-tetramethyl-4-piperidyl) carbonate, bis(2,2,6,6-tetramethyl-4-piperidyl) oxalate, bis(2,2,6,6-tetramethyl-4-piperidyl) malonate, bis(2,2,6,6-tetramethyl-4-piperidyl) sebacate, bis(2,2,6,6-tetramethyl-4-piperidyl) adipate, bis(2,2,6,6-tetramethyl-4-piperidyl) terephthalate, 1,2-bis(2,2,6,6-tetramethyl-4-piperidyloxy)ethane, α,α'-bis(2,2,6,6-tetramethyl-4-piperidyloxy)-p-xylene, bis(2,2,6,6-tetramethyl-4-piperidyl) tolylene-2,4-dicarbamate, bis(2,2,6,6-tetramethyl-4-piperidyl) hexamethylene-1,6-dicarbamate, tris(2,2,6,6-tetramethyl-4-piperidyl) benzene-1,3,5-tricarboxylate, and tris(2,2,6,6-tetramethyl-4-piperidyl) benzene-1,3,4-tricarboxylate, with bis(2,2,6,6-tetramethyl-4-piperidyl) sebacate being preferred. These hindered amine compounds can be used either individually or as a combination of two or more thereof. A combination of the benzotriazole derivative, the oxalic anilide compound, and the hindered amine compound is particularly preferred.

The parting agents (lubricants) include (a) alcohols, (b) fatty acids, (c) esters of the alcohol (a) and the fatty acid (b), (d) polyoxyalkylene glycols, (e) olefin compounds having an average degree of polymerization of 10 to 500, and (f) silicone.

The alcohols (a) include monohydric alcohols and polyhydric alcohols. Examples of the monohydric alcohols are octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, behenyl alcohol, ceryl alcohol, melissyl alcohol, 2-hexyldecanol, 2-isoheptylisoundecanol, 2-octyldodecanol, 2-decyltetradecanol, 2-methylstearyl alcohol, and aminobenzyl alcohol. Examples of the polyhydric alcohols include those containing 2 to 6 carbon atoms, such as ethylene glycol, diethylene glycol, triethylene glycol, propylene glycol, dipropylene glycol, butanediol, pentanediol, hexanediol, glycerol, diglycerol, triglycerol, threitol, erythritol, pentaerythritol, arabitol, ribitol, xylitol, sorbite, sorbitan, sorbitol, mannitol, and mixtures thereof.

The fatty acids (b) include saturated aliphatic carboxylic acids, such as capric acid, lauric acid, myristic acid, palmitic acid, stearic acid, 12-hydroxystearic acid, arachic acid, behenic acid, lignoceric acid, cerotic acid, montanic acid, melissic acid, and ceroplastic acid; unsaturated aliphatic carboxylic acids, such as undecylenic acid, oleic acid, elaidic acid, cetoleic acid, erucic acid, brassidic acid, sorbic acid, linoleic acid, linolenic acid, arachidonic acid, propiolic acid, and stearolic acid; naturally occurring fatty acids containing these fatty acids; and mixtures thereof. These fatty acids may be substituted with a hydroxyl group.

The fatty acid esters (c) preferably include those derived from a fatty acids selected from palmitic acid, stearic acid, behenic acid, and montanic acid and a polyhydric alcohol selected from glycerol, pentaerythritol, sorbitan, and sorbitol. These fatty acid esters may retain a hydroxyl group(s) or no hydroxyl group. There is no limitation as to a hydroxyl group. That is, the ester may be a monoester, a diester, a triester, etc. The remaining hydroxyl group(s) may be blocked by boric acid, etc. Examples of preferred fatty acid esters are glycerol monopalmitate, glycerol dipalmitate, glycerol tripalmitate, glycerol monostearate, glycerol distearate, glycerol tristearate, glycerol monobehenate, glycerol dibehenate, glycerol tribehenate, glycerol monomontanate, glycerol dimontanate, glycerol trimontanate, pentaerythritol monopalmitate, pentaerythritol dipalmitate, pentaerythritol tripalmitate, pentaerythritol tetrapalmitate, pentaerythritol monostearate, pentaerythritol distearate, pentaerythritol tristearate, pentaerythritol tetrastearate, pentaerythritol monobehenate, pentaerythritol dibehenate, pentaerythritol tribehenate, pentaerythritol tetrabehenate, pentaerythritol monomontanate, pentaerythritol dimontanate, pentaerythritol trimontanate, pentaerythritol tetramontanate, sorbitan monopalmitate, sorbitan dipalmitate, sorbitan tripalmitate, sorbitan monostearate, sorbitan distearate, sorbitan tristearate, sorbitan monobehenate, sorbitan dibehenate, sorbitan tribehenate, sorbitan monomontanate, sorbitan dimontanate, sorbitan trimontanate, sorbitol monopalmitate, sorbitol dipalmitate, sorbitol tripalmitate, sorbitol monostearate, sorbitol distearate, sorbitol tristearate, sorbitol monobehenate, sorbitol dibehenate, sorbitol tribehenate, sorbitol monomontanate, sorbitol dimontanate, and sorbitol trimontanate. The fatty acid ester compounds with the hydroxyl group(s) blocked by boric acid, etc. include a boric ester of a glycerol mono-fatty acid ester (JP-A-49-60762). The above-mentioned fatty acid esters or ester compounds may be used either individually or as a mixture of two or more thereof.

The polyoxyalkylene glycols (d) include (d1) polycondensates of an alkylene glycol monomer, such as polyethylene glycol, polypropylene glycol, and ethylene glycol-propylene glycol block copolymers. A preferred number of moles of the monomer unit in the polymer (n) ranges 5 to 1000, particularly 10 to 500. The polyoxyalkylene glycols (d) also include (d2) ether compounds derived from the above-mentioned polyoxyalkylene glycol (d1) and an aliphatic alcohol, such as polyethylene glycol oleyl ether (the number of moles of the ethylene oxide unit: 5 to 50), polyethylene glycol cetyl ether (the number of moles of the ethylene oxide unit: 5 to 20), polyethylene glycol stearyl ether (the number of moles of the ethylene oxide unit: 5 to 30), polyethylene glycol lauryl ether (the number of moles of the ethylene oxide unit: 5 to 30), polyethylene glycol tridecyl ether (the number of moles of the ethylene oxide unit: 5 to 30), polyethylene glycol nonylphenyl ether (the number of moles of the ethylene oxide unit: 2 to 100), and polyethylene glycol octylphenyl ether (the number of moles of the ethylene oxide unit: 4 to 50). Further included are (d3) ester compounds derived from the above-mentioned polyoxyethylene glycols (d1) and higher fatty acids, such as polyethylene glycol monolaurate (the number of moles of the ethylene oxide unit: 2 to 30), polyethylene glycol monostearate (the number of moles of the ethylene oxide unit: 2 to 50), and polyethylene glycol monooleate (the number of moles of the ethylene oxide unit: 2 to 10). The polyoxyethylene glycols (d1) are preferred among these polyoxyethylene glycols.

Examples of reinforcements include inorganic fillers, glass fiber, glass beads, and carbon fiber. The inorganic fillers include talc, mica, wollastonite, asbestos, clay, bentonite, diatomaceous earth, ceramic fiber, and rock wool, with talc and wollastonite being preferred.

It is preferred for the inorganic fillers, glass fiber, glass beads, and carbon fiber be surface-treated with a polyurethane emulsion containing a silane coupling agent.

Preferred silane coupling agents include aminoalkylsilanes, such as δ-aminopropyltriethoxysilane, δ-(N-aminoethyl)aminobutyltriethoxysilane, δ-[N-methylethyl(N-aminoethyl)amineiminobutyl]-triethoxysilane, bis[γ-(N-propyldiethylamino)propyl]dimethoxysilane, bis[β-(N-aminoethyl)]diethoxysilane, β-[(N-ethylamino)amino]ethyltrimethoxysilane, γ-propyl (N-aminoethyl)aminotrimethoxysilane, and β-(N-ethylamino)ethyltri(β-methoxyethoxy)silane. The isocyanate compound forming the urethane of the polyurethane emulsion preferably includes non-yellowing diisocyanates, such as hexamethylene diisocyanate, lysine diisocyanate, hydrogenated 2,4-toluylene diisocyanate, hydrogenated 4,4-diphenylmethane diisocyanate, dicyclohexyldimethylmethane p,p'-diisocyanate, diethyl fumarate diisocyanate, isophorone diisocyanate, and hydrogenated xylylene diisocyanate; and aromatic polyisocyanates, such as 2,4-toluylene diisocyanate, 4,4'-diphenylmethane diisocyanate, xylylene diisocyanate, p-phenylmethane diisocyanate, naphthalene-1,5-diisocyanate, triphenylmethane triisocyanate, and polymethylene polyphenyl isocyanate. The polyhydroxy compounds include polyesters derived from a carboxylic acid, such as adipic acid, sebacic acid, maleic acid, and dimeric acid, and a hydroxy compound, such as ethylene glycol, propylene glycol, butylene glycol, and trimethylolpropane; diols obtained by ring opening of alkylene oxides, such as ethylene oxide, propylene oxide, and tetrahydrofuran; polyols obtained by adding the above-mentioned alkylene oxide to polyhydric alcohols, such as glycerol, neopentyl glycol, trimethylolpropane, and sorbitol; and single polyols, such as ethylene glycol, propylene glycol, butylene glycol, hexamethylene glycol, trimethylolpropane, trimethyloethane, glycerol, 1,2,6-hexanetriol, and pentaerythritol.

The pigments include inorganic pigments and organic pigments. The inorganic pigments are those generally used for coloring resins, such as zinc sulfide, zinc oxide, titanium oxide, barium sulfate, Titan Yellow, iron oxide, ultramarine, cobalt blue, calcined pigments, carbonates, phosphates, acetates, carbon black, acetylene black, lamp black, and the like. The organic pigments include condensed azo pigments, isoindoline pigments, disazo pigments, monoazo pigments, anthraquinone pigments, heterocyclic pigments, perinone pigments, quinacridone pigments, thioindigo pigments, perylene pigments, dioxazine pigments, and phthalocyanine pigments.

The polyoxymethylene resin composition of the present invention is prepared by melt kneading polyoxymethylene and the vinyl compound having a primary acid amide group and an acid imide group by means of a kneader, a single-screw extruder, a twin-screw extruder, etc., preferably at a temperature of 180 to 240° C.

The polyoxymethylene resin composition of the present invention can be molded by any of frequently employed molding techniques, such as compression molding, injection molding, extrusion molding, blow molding, rotational molding, gas-assisted molding, and the like, preferably injection molding or gas-assisted molding.

Because of its excellent heat stability and weatherability, the polyoxymethylene resin composition of the invention is suitably applied to electric and electronic parts, such as sensors, LED lamps, connectors, sockets, resistors, switches, coil bobbins, condensers, light pickups, oscillators, various terminal plates, transformers, plugs, printed circuit boards, tuners, speakers, microphones, headphones, small-sized motors, magnetic head cases, power modules, semiconductors, liquid crystals, FDD chassis, FDD carriages, magnetic cassette reels, motor brush holders, parabolic antennae, and computer-related parts. It is also applicable to parts of domestic appliances and office electric equipment, such as VTR, VTR cameras, TV sets, irons, hair driers, shavers, fans, juicers, rice cookers, microwave ovens, and audio systems, e.g., headphone stereos, radio cassette recorders, laser discs, and compact discs, lights, refrigerators, air conditioners, typewriters, pocket calculators, and word processors; office computer-related parts; electricity-related parts; facsimile-related parts; photocopier-related parts; machinery-related parts, such as those of washing holders, motors, lighters, and typewriters; parts of optical and precision instruments, such as microscopes, binoculars, cameras, and watches; automotive parts and other vehicle-related parts, such as alternator terminals, alternator connectors, IC regulators, potentiometer bases for light jars, various valves in a fuel system, an exhaust system (e.g., exhaust valve) and an intake system, air intake nozzle snorkels, intake manifolds, gasoline pumps, engine cooling water joints, carburetor main bodies, carburetor spacers, exhaust gas sensors, cooling water sensors, oil temperature sensors, brake pad wear sensors, slot position sensors, crankshaft position sensors, air flow sensors, thermostat bases for an air conditioner, warm-air flow control valves, brush holders for a radiator motor, water pump impellers, turbine vanes, wiper motor-related parts, distributors, starter switches, starter relays, wire harnesses for a transmission, air conditioner panel switch boards, coils for fuel-related electromagnetic valves, connectors for fuses, horn terminals, insulating panels for electric parts and accessories, step motor rotors, lamp sockets, lamp reflectors, lamp housings, brake pistons, solenoid bobbins, engine oil filters, ignition cases, radiator drain cocks, in-tank fuel pumps, diaphragm valves, autoantenna gear cases, door locks, turn signal cases, wiper gears, wiper pivot bearings, speed meter gears, parts, housings, window glass bottom channels, seat belt housings, seat belt retractor parts, heater control levers, inside door handles, window regulator handles, outer door handles, sun visor brackets, seat hooks, fender mirror cases, fuel cups, and washer nozzles; bicycle parts; partition corner pieces, curtain liners, bright gears, sash rollers, bindings, office furniture parts, various fasteners, piping systems, hose joints, valves, adjustors, meters, parts of shoes, parts of sporting goods, toys, music boxes, toilet articles (e.g., combs), caster brackets, rollers, caps, measuring parts, air sol hoses, and various other parts of equipment.

EXAMPLES

The present invention will now be illustrated by way of Examples, but the present invention should not be construed as being limited thereto.

(1) Evaluation of heat stability of polyoxymethylene resin composition in the presence of oxygen:

One gram of polyoxymethylene resin composition pellets was kept at 230° C. in air by means of TGA-7 manufactured by Perkin-Elmer Co., and the weight loss was measured with a thermobalance. The heat stability of the polyoxymethylene resin composition in the presence of oxygen was evaluated in terms of the time required for the weight loss to reach 3%. The longer the time, the more excellent the heat stability in the presence of oxygen.

(2) Evaluation of weatherability of polyoxymethylene resin composition:

Pellets of a polyoxymethylene resin composition were dried at 80° C. for 3 hours and injection molded using a mold made of Nikko 70A produced by The Japan Steel Works, Ltd. to obtain a dumbbell shaped specimen (ASTM-3) under conditions of a cylinder temperature of 200° C., an injection pressure of 40 kg/cm$^2$, a mold temperature of 90° C., a cooling time of 20 seconds, and a molding cycle of 60 seconds. The specimen was set in a fadeometer (WEL-SUN-HC-B$_0$EM Model, manufactured by Suga Shikenki K.K.) and exposed to light at a black panel temperature of 83° C. and a humidity of 50%. After 1200 hours' exposure, cracking on the light-irradiated side of the specimen was observed under a microscope having a magnification of 100 and graded as follows.

0 . . . No crack.

1 . . . Slight cracks were observed.

2 . . . Cracks were long. More than 20 cracks were observed in a field of view.

Sample 1:

In a 5000 ml flask equipped with a stirrer were charged 1000 ml of 2-propanol, 100 g of acrylamide, and 0.8 g of 2,2-azobisisobutyronitrile, and the mixture was stirred at 70° C. for 120 minutes. To the mixture was added 2000 ml of hexane, and the precipitated polyacrylamide was collected by filtration, dried in vacuo at 60° C. for 6 hours, and ground in a jet mill (PJN-I-3 Model, manufactured by Nippon Pneumatic Kogyo K.K.). The ground polyacrylamide was found to have a number average particle size of 4 μm as measured with a Coulter counter (manufactured by Coulter Electronics, Inc., U.S.A).

Sample 2:

In a 5000 ml flask equipped with a stirrer were charged 1000 ml of 2-propanol, 100 g of acrylamide, 1 g of N,N-methylenebisacrylamide, and 0.8 g of 2,2-azobisisobutyronitrile, and the mixture was stirred at 70° C. 120 minutes. After completion of the polymerization, 2000 ml of hexane was added to the mixture, and crosslinked polyacrylamide thus precipitated was collected by filtration, dried in vacuo at 60° C. for 6 hours, and ground in a jet mill to a number average particle size of 1 μm in the same manner as for sample 1.

Sample 3:

900 g of acrylamide dried under vacuum at 60° C. for 6 hours, 100 g of methylenebisacrylamide and 0.445 g (1/5000 mol per mole of acrylamide) of calcium n-propylate as a catalyst were reacted to be polymerized in a 5 L kneader under a nitrogen stream at 130° C. for 4 hours. After completion of the polymerization, the resulting polymer was roughly pulverized and dried under vacuum at 60° C. for 6 hours, and ground in a jet mill in the same manner as in the preparation of Samples 1 and 2, so as to obtain poly-β-alanine having a number average particle size of 3 μm. The content of methylenebisacrylamide in the resulting poly-β-alanine was 11% by weight, and the content of primary amide group was 50 mol % with the content of acrylamide being 100 mol. The polymerization method was in accordance with JP-B-5-87096, and the quantitative determination of primary amide group was in accordance with JP-B-6-68058.

Example 1

In a 1000 ml flask was put 7.1 g of sample 1 (polyacrylamide fine particles; primary acid amide group content: 100 mmol) and heated at 170° C. while introducing 1 L/hr of nitrogen into the flask. The nitrogen discharged from the flask was led to a trap containing 1000 ml of 0.1N sulfuric acid to capture ammonia. Two hours later, an indicator Methyl Red was added to the trap, and sulfuric acid was titrated with a 0.1N sodium hydroxide aqueous solution. As a result, 951 ml of a 0.1N sodium hydroxide aqueous solution was required for neutralization. From this result, it is seen that the starting fine particles of polyacrylamide as sample 1 (primary acid amide group: 100 mol %) was modified by the heat treatment into a vinyl polymer having an acid imide group content of 5.3 mol % and a primary acid amide group content of 94.7 mol %, and the acid imide group content in the vinyl polymer became 0.056 mol per mole of the primary acid amide group. The acid imide group content of the modified vinyl polymer after heat treatment was also determined from the carbon to nitrogen weight ratio obtained by elementary analysis. As a result, the modified vinyl polymer was found to have an acid imide group content of 5.0 mol % and a primary acid amide group content of 95.0 mol %. Further, infrared spectrophotometry was applied to sample 1 before and after the heat treatment. Sample 1 before the heat treatment shows an infrared absorption spectrum characteristic of polyacrylamide, while sample 1 after the heat treatment revealed an amide III absorption band at 1210 cm$^{-1}$ assigned to an acid imide group.

A hundred parts by weight of an oxymethylene homopolymer with its both terminals acetylated (MI: 15 g/10 min), which was prepared by the known process described in U.S. Pat. No. 2,998,409, and 0.3 part by weight of the above prepared vinyl polymer were mixed uniformly in Supermixer manufactured by Kawada Seisakusho. The mixture was melt-kneaded in a vented twin-screw extruder (PCM-30 manufactured by Ikegai Corp.; screw diameter: 30 mm) at a screw revolution speed of 30 rpm, a cylinder temperature of 200° C., and a retention time of 180 seconds and extruded to obtain pellets of a polyoxymethylene resin composition.

The heat stability in the presence of oxygen and weatherability of the resulting polyoxymethylene resin composition were both satisfactory as shown in Table 1 below.

Example 2 to 7

The same procedure as in Example 1 was repeated using sample 1 or 2 as a starting material, except for the heating time. The acid imide group content of the resulting vinyl polymer, the amount of the vinyl polymer mixed with the polyoxymethylene, and the results of evaluation on the resulting polyoxymethylene resin composition are shown in Table 1. The resin composition exhibited satisfactory heat stability in the presence of oxygen and satisfactory weatherability in each Example.

Comparative Example 1

Sample 1 was extruded in the same manner as in Example 1 but was not heated. The resulting polyoxymethylene resin composition was unsatisfactory in heat stability in the presence of oxygen and weatherability. This is because sample 1 has no acid imide group.

Comparative Example 2

Sample 2 was extruded in the same manner as in Example 1 but was not heated. The resulting polyoxymethylene resin composition was unsatisfactory in heat stability in the presence of oxygen and weatherability. This is because sample 2 has no acid imide group.

Comparative Example 3

Polyoxymethylene (100 parts by weight) and 0.005 part by weight of the vinyl polymer used in Example 1 were compounded and extruded in the same manner as in Example 1. As shown in Table 1, the resulting polyoxymethylene resin composition was unsatisfactory in heat stability in the presence of oxygen and weatherability. This is because the amount of the vinyl polymer added was too small.

Comparative Example 4

Polyoxymethylene (100 parts by weight) and 20 parts by weight of the vinyl polymer used in Example 1 were compounded and extruded in the same manner as in Example 1. As shown in Table 1, the resulting polyoxymethylene resin composition was satisfactory in both heat stability in the presence of oxygen and weatherability, but a molded article obtained therefrom had no gloss and poor appearance.

TABLE 1

| Example No. | Starting Material | Heating Time (hr) | Imide Group Content[1] (mol %) | Amount of Vinyl Polymer Added (part by wt.) | Time for 3% weight loss at 230° C. in the Presence Presence of Oxygen (min) | Weatherability[2] |
| --- | --- | --- | --- | --- | --- | --- |
| Example 1 | sample 1 | 2 | 0.056 | 0.3 | 250 | 0 |
| Example 2 | " | 2 | 0.056 | 1.0 | 380 | 0 |
| Example 3 | " | 0.1 | 0.0002 | 10 | 160 | 0 |
| Example 4 | sample 2 | 3 | 0.067 | 0.05 | 200 | 0 |
| Example 5 | " | 0.2 | 0.001 | 6.0 | 240 | 0 |
| Example 6 | " | 0.15 | 0.0008 | 10 | 230 | 0 |
| Example 7 | " | 20 | 0.220 | 0.02 | 210 | 0 |
| Comparative Example 1 | sample 1 | — | — | 10 | 15 | 2 |
| Comparative Example 2 | sample 2 | — | — | 20 | 30 | 2 |

TABLE 1-continued

| Example No. | Starting Material | Heating Time (hr) | Imide Group Content[1] (mol %) | Amount of Vinyl Polymer Added (part by wt.) | Time for 3% weight loss at 230° C. in the Presence Presence of Oxygen (min) | Weather-ability[2] |
|---|---|---|---|---|---|---|
| Comparative Example 3 | sample 1 | 2 | 0.056 | 0.005 | 70 | 1 |
| Comparative Example 4[3] | " | 2 | 0.056 | 20 | 450 | 0 |

Note:
[1] Imide group content per mole of primary acid amide group
[2] Fadeometer, 1200 hr-exposure; 0: No crack; 1: Slight cracks; 2: Long cracks. More than 20 cracks per field of view.
[3] Seriously poor appearance Example 8

A hundred parts by weight of the polyoxymethylene resin composition prepared in Example 1 were mixed with 0.2 part by weight of an antioxidant, triethylene glycol bis[3-(3-t-butyl-5-methyl-4-hydroxyphenyl)propionate] (Irganox 245 produced by Ciba-Geigy Ltd.), in Supermixer, and the mixture was extruded in the same manner as in Example 1 to obtain pellets. As a result of evaluation of heat stability and weatherability, the time for the weight loss of 3% at 230° C. was 320 minutes, and the grade in the weatherability test was 0.

Example 9

A hundred parts by weight of the polyoxymethylene resin composition prepared in Example 1 were mixed with 0.3 part by weight of 2-(2'-hydroxy-3',5'-diisoamylphenyl) benzotriazole as a weather (light) stability (Tinuvin 234 produced by Ciba-Geigy Ltd.) and 0.2 part by weight of bis(2,2,6,6-tetramethyl-4-piperidyl) sebacate as a formic acid scavenger (Sanol LS770 produced by Sankyo Co., Ltd.) in Supermixer, and the mixture was extruded in the same manner as in Example 1 to obtain pellets. As a result of evaluation of heat stability and weatherability, the time for the weight loss of 3% at 230° C. was 260 minutes, and the grade in the weatherability test was 0. When the exposure time in the fadeometer was extended to 3600 hours, the grade was still 0. The polyoxymethylene resin composition of Example 1 was graded 1 in this prolonged weatherability test.

Example 10

In a 1000 ml frask was put sample 3 and was heated at 170° C. for 5 hours while introducing nitrogen into the flask in the same manner as in Example 1. The nitrogen discharged from the flask was trapped to determine the amount of acid imide group. As a result, sample 3 (having a primary amide group content of 50 mol % other than methylenebisacrylamide as a crosslinking aegnt) was modified by the heat treatment into a vinyl polymer having an acid imide group content of 2.7 mol % and a primary acid amide group content of 47.3 mol %, and the acid imide group content in the vinyl polymer was 0.056 mol per mole of the primary acid amide group. The sample 3 thus heat-treated was evaluated in the same manner as in Example 1. As a result, the time for the weight loss of 3% at 230° C. was 260 minutes, and the grade in the weatherability test was 0.

Comparative Example 5

A hundred parts by weight of the polyoxymethylene resin composition prepared in Example 1 were mixed with 0.2 part by weight of Irganox 245 in Supermixer, and the mixture was extruded in the same manner as in Example 1 to obtain pellets. As a result of evaluation of heat stability and weatherability, the time for the weight loss of 3% at 230° C. was 4 minutes, and the grade in the weatherability test was 2.

Comparative Example 6

A hundred parts by weight of the polyoxymethylene resin composition prepared in Comparative Example 5 were mixed with 0.3 part of Tinuvin 234 and 0.2 part by weight of Sanol LS770 in Supermixer, and the mixture was extruded in the same manner as in Example 1 to obtain pellets. As a result of evaluation of heat stability and weatherability, the time for the weight loss of 3% at 230° C. was 5 minutes, and the grade in the weatherability test was 1.

Comparative Example 7

The same procedures in Example 10 were repeated except that sample 3 was not heat-treated. As a result, the time for the weight loss of 3% at 230° C. was 60 minutes, and the grade in the weatherability test was 1.

INDUSTRIAL APPLICABILITY

The polyoxymethylene resin composition according to the present invention is superior to conventional ones in heat stability during molding and weatherability and is suited for use as a molding material for electric and electronic parts and automotive parts.

I claim:

1. A polyoxymethylene resin composition comprising (A) 100 parts by weight of a polyoxymethylene resin and (B) 0.01 to 10 parts by weight of a vinyl polymer having a primary acid amide group and an acid imide group.

2. A polyoxymethylene resin composition according to claim 1, wherein said vinyl polymer (B) contains 0.0001 to 0.25 mol of an acid imide group per mole of a primary acid amide group.

3. A polyoxymethylene resin composition according to claim 1, wherein said vinyl polymer (B) is a vinyl polymer derived from polyacrylamide, polymethacrylamide or poly-β-alanine by converting part of a primary acid amide group thereof to an acid imide group.

4. A polyoxymethylene resin composition according to claim 1, wherein said vinyl polymer (B) is a vinyl polymer obtained by heating a vinyl polymer having a primary acid amide group to convert part of said primary acid amide group to an acid imide group.

5. A polyoxymethylene resin composition according to claim 1, wherein said vinyl polymer (B) has a number average particle size of 0.5 to 5 μm.

6. A polyoxymethylene resin composition according to claim 2, wherein said vinyl polymer (B) is a vinyl polymer derived from polyacrylamide, polymethacrylamide or poly-β-alanine by converting part of a primary acid amide group thereof to an acid imide group.

7. A polyoxymethylene resin composition according to claim 2, wherein said vinyl polymer (B) is a vinyl polymer obtained by heating a vinyl polymer having a primary acid amide group to convert part of said primary acid amide group to an acid imide group.

8. A polyoxymethylene resin composition according to claim 3, wherein said vinyl polymer (B) is a vinyl polymer obtained by heating a vinyl polymer having a primary acid amide group to convert part of said primary acid amide group to an acid imide group.

9. A polyoxymethylene resin composition according to claim 2, wherein said vinyl polymer (B) has a number average particle size of 0.5 to 5 μm.

10. A polyoxymethylene resin composition according to claim 3, wherein said vinyl polymer (B) has a number average particle size of 0.5 to 5 μm.

11. A polyoxymethylene resin composition according to claim 4, wherein said vinyl polymer (B) has a number average particle size of 0.5 to 5 μm.

12. The polyoxymethylene resin composition according to claim 6, wherein said vinyl polymer (B) is a vinyl polymer obtained by heating a vinyl polymer having a primary acid amide group to convert part of said primary acid amide group to an acid imide group.

13. The polyoxymethylene resin composition according to claim 6, wherein said vinyl polymer (B) has a number average particle size of 0.5 to 5 μm.

14. The polyoxymethylene resin composition according to claim 12, wherein said vinyl polymer (B) has a number average particle size of 0.5 to 5 μm.

* * * * *